June 2, 1953 R. J. HARKENRIDER 2,640,744
TRACTION MOTOR LUBRICATOR
Filed Nov. 3, 1949
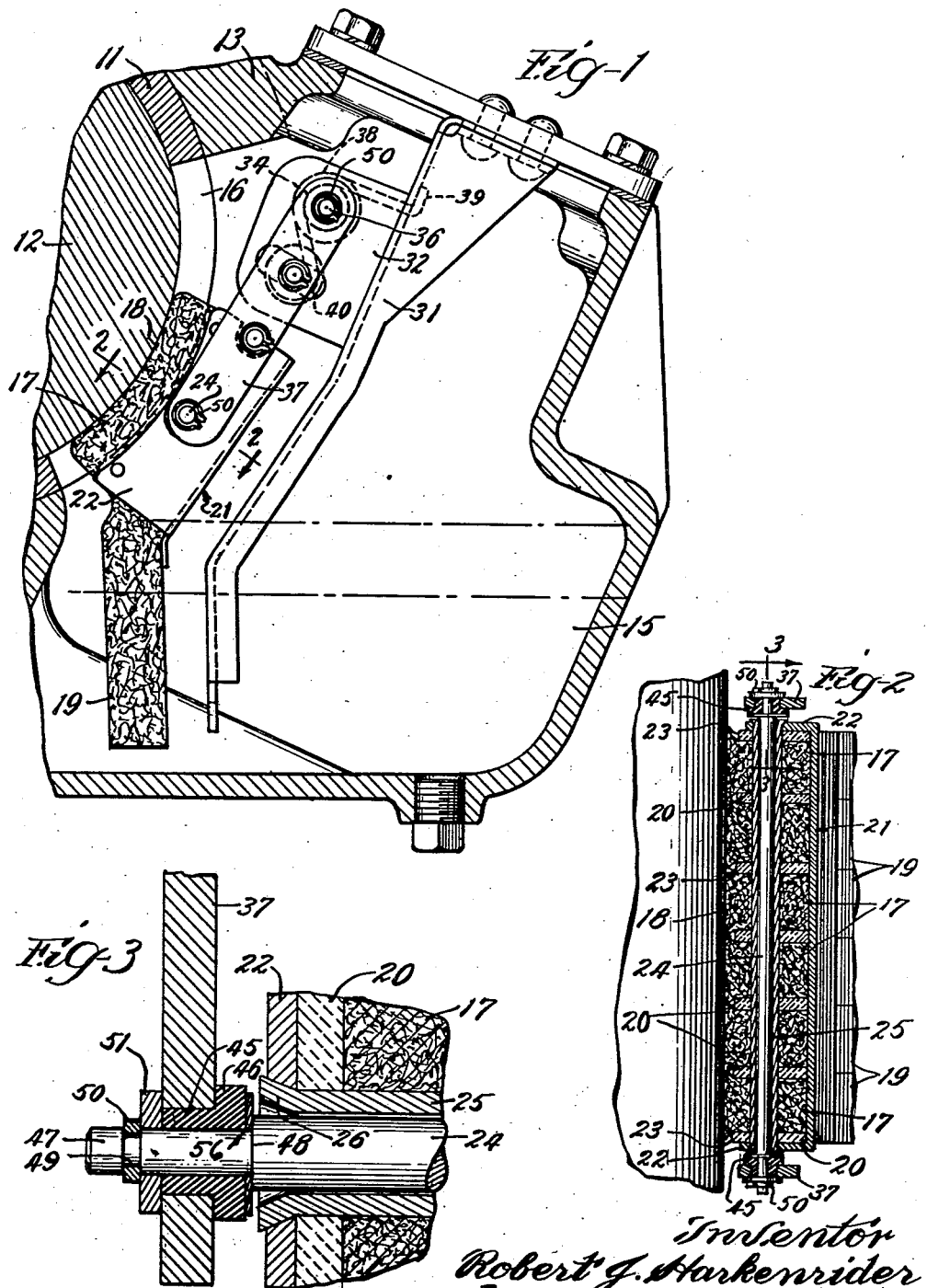
Inventor
Robert J. Harkenrider
By Mann and Brown
Attys.

Patented June 2, 1953

2,640,744

UNITED STATES PATENT OFFICE 2,640,744

TRACTION MOTOR LUBRICATOR

Robert J. Harkenrider, Winona, Minn., assignor to Gladys D. Miller, Winona, Minn.

Application November 3, 1949, Serial No. 125,310

2 Claims. (Cl. 308—132)

1

Traction motors for diesel locomotives and the like are suspended on the driving wheel axles, and the bearings by which they are suspended are subjected to terrific vibration at high speed due to irregularities in the track on which the drivers roll. Proper lubrication is imperative, and the most satisfactory lubricators for some locomotives have included a pad confined in a metal holder pivotally mounted on a resilient carrier so as to allow the pad to accommodate itself to the journal and the conditions of rotation and travel, but the vibration communicated to the pad and the holder causes a violent hammering on the pivotal mounting of the holder on the carrier, which has caused rapid wear and deterioration.

The principal object of this invention is to provide means to take the hammering at the pivot and endure a long period of service.

In the drawings:

Fig. 1 is a transverse vertical section through a portion of a motor suspension bearing and the axle to which it is applied;

Fig. 2 is a section on the line 2—2 of Fig. 1; and

Fig. 3 is a section on the line 3—3 of Fig. 2 enlarged.

In Fig. 1, there appears a fragment of a motor suspension bearing represented by the bearing liner or shell 11 forming the actual bearing for the wheeled axle 12. Associated with these is an axle cap 13 bolted to the motor frame and provided with an oil reservoir 15. Lubrication is supplied to the journal by means lifting the oil from the reservoir 15 and applying it to the journal through the window opening 16 in the shell or liner 11.

In this embodiment illustrating the invention, that is done by an applicator composed of a group of felt bodies 17 each having a curved surface 18 to bear on the axle 12 and a wick section 19 adapted to extend down into the supply of oil in the reservoir 15 and continuously deliver to the pad section 17 by capillary action.

The felt bodies alternate with stop plates 20 of resilient bearing material, and the whole group of alternating felt bodies and stop plates is assembled in a metal holder 21 of channel shape providing a generally flat base and spaced flanges 22 embracing the group and giving lateral support to it.

While the stop plates 20 actually separate the several felt bodies, the latter project beyond the front edges 23 of the stop plates and expand so as to close the gaps between them and present,

2 for all practical purposes, a uniform applicator surface from one side of the group to the other.

The channel-shaped holder 21 with its flanges 22 embracing the entire group of pads or stop plates (supplemented by transverse rivets when appropriate) furnishes an appropriate confinement and also a base for mounting the group applicator.

It has been found that felts or felt bodies on the order of $3/4''$ to $1\tfrac{1}{8}''$ thick are about the most satisfactory, and that exposed portions beyond the stop plates 20 of $1/2''$ to $5/8''$ will insure a long period of service while reducing the lateral spreading below an objectionable amount and allowing enough spreading to make the contact surface of the whole complete and substantially uniform. Such an arrangement provides a surface that will wear about $\tfrac{1}{16}''$ for 100,000 miles of travel against a journal surface that is as smooth as it should be in practice.

The stop plates 20 for such felts may be on the order of $\tfrac{1}{16}''$ to $\tfrac{1}{8}''$ thick. They should project beyond the flanges 22 enough to insure that those flanges will never come in striking contact with the journal. One-sixteenth inch to $1/8''$ projection of the stop plates will be sufficient.

It is important to have the felts automatically set against the journal and automatically conform to the surface to be lubricated, irrespective of accumulation of tolerances. To accomplish this, the applicator group or unit is pivoted, for instance, on a rod 24 parallel to the journal 12 and having its axis substantially equidistant between the ends of the surfaces 18 intended to bear on the journal. With that arrangement and yielding pressure applied to the group, there is a natural tendency for the felts to conform to the surface to be lubricated, and otherwise act to perform the desired function.

The pivotal mounting is appropriately made by providing the holder 21 with a bushing 25 extending through the flanges 22, the felt bodies 17, and the stop plates 20, and having its end portions swaged to the flanges 22, as indicated at 26.

It is eminently desirable to have the felt bodies yieldingly pressed against the journal. When a locomotive is operating at high speed, on the order of 90 to 100 miles an hour, there is a terrific vibration of the axles due to irregularities in the track. That vibration, while presenting a problem, is also turned to advantage in lubrication with the present invention, for each vibration effects a momentary compression of the felt bodies followed by a momentary relaxation, resulting in expansion. Each compression ejects oil from the pad, and each expansion makes it act like a sponge. In effect, the felt assemblies pat the journal as the locomotive runs along.

For many installations, the yielding pressure on the applicator is best furnished by mounting it to swing toward the journal in response to spring pressure. In Fig. 1, the applicator is shown on a mounting plate 31 having spaced flanges 32 formed by striking up the metal. The flanges are provided with a tubular bushing or bushings 34, which form a bearing for the pivot rod 36 for two levers 37 through which the rod 24 passes, and by which the applicator is made to swing about the axis of the rod 36. The bushing or bushings form a mounting for a torsion spring 38 having its end portions 39 and 40 engaged, respectively, with the mounting plate 31 and the levers to normally urge the free ends of the levers and the applicator toward the journal.

The rod 24 is extended through openings adjacent to the free ends of the levers 37 to form the pivotal mounting for the applicator.

Assuming the rod to be on the order of $\frac{7}{16}''$ in diameter and the levers to be $\frac{7}{16}''$ thick, it will be apparent that the vibration communicated to the pads 17 and the holder 21 will cause violent hammering of the rod 24 on the levers 37, and in practice it has been demonstrated that the metal can only stand a short period of service.

To correct that situation and provide for long wear, the openings in the free ends of the levers 37 are made relatively large and provided with bushings 45 of resilient bearing material flanged at 46 on the inner side to bear against the flanges 22 of the holder 21. The rod 24 is slightly reduced at 47 to form a shoulder 48 to receive a metal washer 56, and the outer end of the reduced portion 47 is provided with a groove 49 to receive a retaining ring 50, a washer 51 being inserted between the retaining ring and the adjacent lever 37.

Preferably, the bushing is made of polymerized chloroprene to be had on the market under the trademark "neoprene" (or "Hycar") of the E. I. du Pont de Nemours & Co. It is a rubber-like material, but more resistant to oils and chemicals than rubber and having a suitable resiliency and impact resisting quality for this particular service. It is molded to size and secured to the lever arm 37 by neoprene cement comprising a solution of neoprene and a solvent, with the possible addition of strengthening fibers and a curing agent.

With such a bushing $\frac{3}{32}''$ to $\frac{1}{8}''$ thick on a reduced portion 47, $\frac{3}{8}''$ in diameter or thereabouts, the pivotal connection endures a long period of service in spite of the violent hammering to which it is subjected.

Other rubberlike materials that effectively resist oils and alkalies may be used instead of neoprene. For example, those synthetic rubbers are made in two steps, by manufacture of the monomer and then by polymerization or condensation. Butyl rubber, a variation of Buna rubber, made from petroleum, produced by the B. F. Goodrich Company and called "Ameripol," may be used. It is marketed under the name of "Hycar" by the Hydrocarbon & Chemical Rubber Company.

This application is a continuation-in-part of my application for Journal Lubricator, Ser. No. 109,750, filed August 11, 1949, and of my application Ser. No. 109,563, filed August 10, 1949, for Traction Motor Lubricator.

I claim:

1. In a journal lubricator for traction motors, a carrier including a pair of spaced pivotal arms, resilient mounting means therefor, a holder for a lubricating pad positioned between the arms, a pin pivotally mounting the holder on the arms, and a bearing for the pin including a bushing of polymerized chloroprene cemented to each arm and sleeved around the pin.

2. In a journal lubricator for traction motors, a carrier including a pair of spaced pivotal arms, resilient mounting means therefor, a holder for a lubricating pad positioned between the arms, a pin pivotally mounting the holder on the arms, and a bearing for the pin including a bushing of polymerized chloroprene bonded to each arm and sleeved around the pin.

ROBERT J. HARKENRIDER.

References Cited in the file of this patent

UNITED STATES PATENTS

| Number | Name | Date |
|---|---|---|
| 329,730 | Gibbons | Nov. 3, 1885 |
| 334,013 | Gibbons | Jan. 12, 1886 |
| 2,397,124 | Buffington | Mar. 26, 1946 |